United States Patent [19]
Yamana et al.

[11] Patent Number: 5,696,607
[45] Date of Patent: Dec. 9, 1997

[54] IMAGE READER HAVING A LIGHT-GUIDING TRANSPARENT BOARD

[75] Inventors: Shinji Yamana, Yamatokooriyama; Terukazu Ohtsuki, Ikoma-gun; Hitoshi Ikeda, Ikoma; Takehiro Yamamoto, Osaka, all of Japan

[73] Assignee: Sharp Kabushiki Kaisha, Osaka, Japan

[21] Appl. No.: 539,165

[22] Filed: Oct. 4, 1995

[30] Foreign Application Priority Data

Oct. 7, 1994 [JP] Japan ................................ 6-243909

[51] Int. Cl.⁶ ...................................................... H04N 1/04
[52] U.S. Cl. ........................ 358/474; 358/84; 382/321
[58] Field of Search ................................ 382/312, 313, 382/314, 315, 316, 317, 321, 322, 323; 358/474, 478, 482, 483, 484; 235/467, 459, 462, 461; 385/146, 36

[56] References Cited

U.S. PATENT DOCUMENTS

| | | | |
|---|---|---|---|
| 4,813,765 | 3/1989 | Negishi | 388/146 |
| 5,581,076 | 12/1996 | Tabata | 358/484 |

FOREIGN PATENT DOCUMENTS

| | | | |
|---|---|---|---|
| 404078979 | 3/1992 | Japan | 382/321 |
| 404078980 | 3/1992 | Japan | 382/321 |
| WO9007800 | 7/1990 | WIPO | H01P 1/16 |

Primary Examiner—Thomas D. Lee
Assistant Examiner—Jerome Grant II

[57] ABSTRACT

An image reader is equipped with a light source having a plurality of LEDs arrayed in a row, a light-guiding transparent board, a concave mirror, a condenser lens and a photoelectric converter. The transparent board is disposed between the light source and the concave mirror, and has an illuminating light output surface to be in contact with a document, an illuminating light input surface which is tilted at an angle relative to the output surface and on which light from the light source is to be incident, and first and second side surfaces located in opposition to each other between the illuminating light input and output surfaces. In operation, since the output surface is tightly in contact with the document, light dissipation is prevented. Since the input surface and the output surface are sufficiently separated from each other, rays of light emitted by the individual LEDs are mixed up inside the transparent board. Reflected light from the document travels inside the transparent board, is then reflected by the input surface, and goes out from the second side surface to the photoelectric converter via the condenser lens.

14 Claims, 6 Drawing Sheets

Photodetection Member

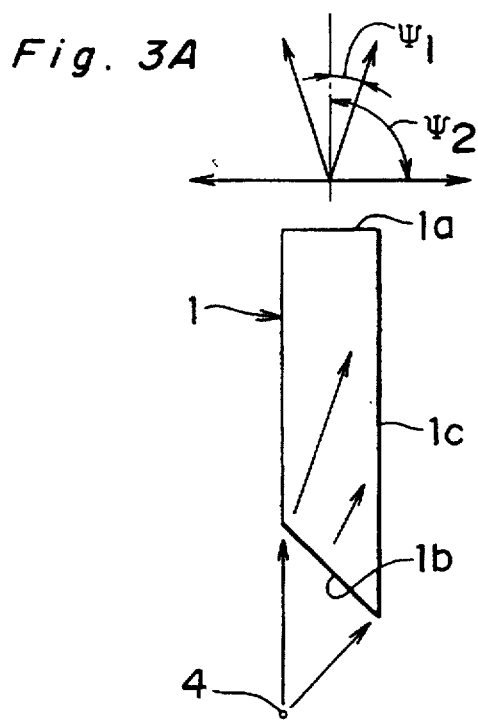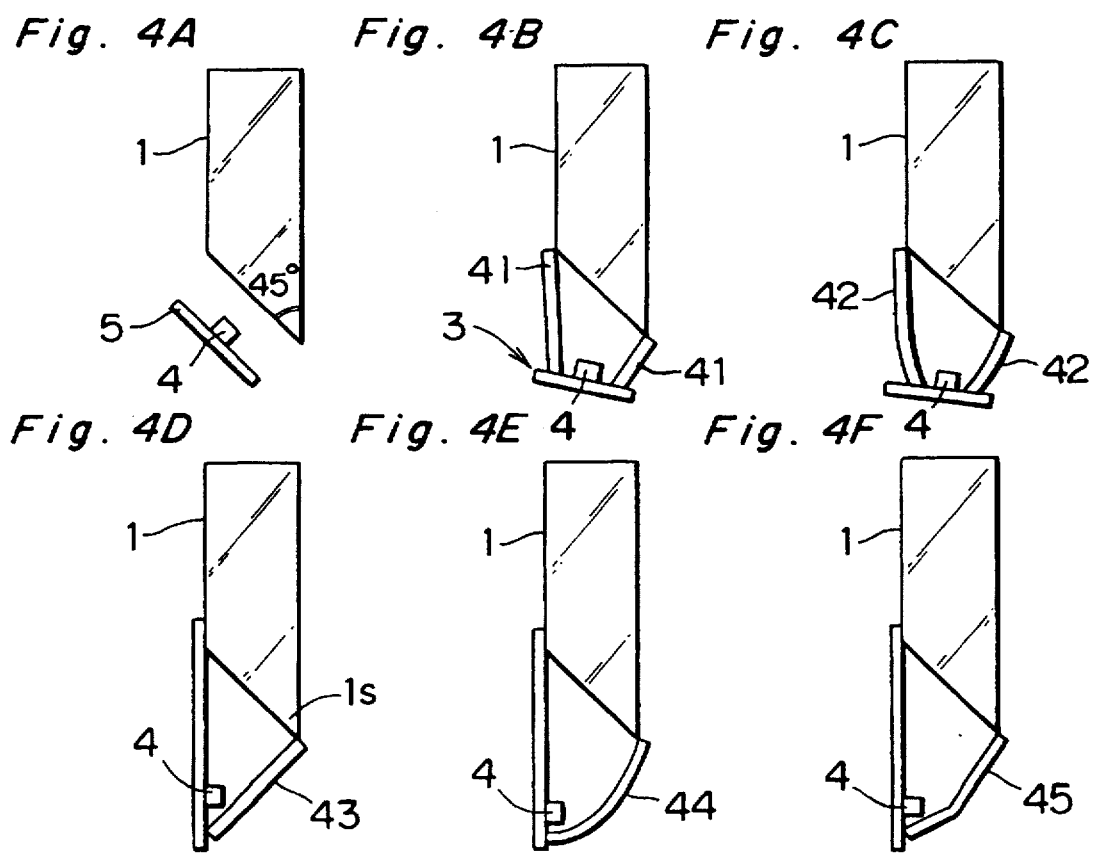

IMAGE READER HAVING A LIGHT-GUIDING TRANSPARENT BOARD

BACKGROUND OF THE INVENTION

1. Field of the Invention

The present invention relates to image readers which illuminate an object to be read (referred to as "read object") and convert image information within an illuminated area into various types of time series or spatial distribution information, some image readers being adapted to record the converted information. More specifically, the invention relates to small-sized, low-price image readers to be used in copiers, digital copiers, facsimiles, image scanners, bar-code readers, and the like.

2. Description of the Prior Art

In recent years, image scanners, facsimiles, and the like which incorporate an image reader have been becoming increasingly smaller in size and lower in price. Also, the image readers have been receiving growing needs as a component of portable equipment.

FIG. 5A outlines the configuration of a conventional miniature optics type optical reader. In this optical reader, light from an illuminating light source 50 is directed to a document 51 to be read, and image-surface reflected light derived from the document 51 is turned by a first mirror 52, a second mirror 53, and a third mirror 54. Thus, an image is formed on a linear optical sensor 56 by an image-forming lens unit 55. The document 51 is transferred on a stage glass 57 in pressure contact therewith by a roller 58.

FIG. 5B shows the illuminating light source 50. The illuminating light source 50 has a plurality of light-emitting diodes (hereinafter, referred to as LEDs) 61, as light-emitting elements, mounted on a wiring board 60. The illuminating light source 50 illuminates the document 51 from a distance of about 5 to 10 mm in order to reduce variations in illuminance (referred to as "ripples"). As a result, the ripples are suppressed to within 15%.

When the document 51 is of a B4 size and its read width is 256 mm, about thirty to fifty LEDs 61 are required, where the illuminance on the document 51 is a few hundreds lux. The optical path length from the document 51 to the linear optical sensor 56 is about 300 mm, and the image information on the document 51 forms an image, reduced in size to about ⅒, on the linear optical sensor 56.

For the light source 50 in which a plurality of LEDs 61 are arrayed in line, in order to mix up rays of light derived from the individual LEDs 61, it is necessary to place the light source 50 away from the document 51. The reason is that if the distance between the light source 50 and the document 51 is too small, the rays of light from the LEDs 61 would not be sufficiently mixed, resulting in large variations in illumination, that is, large ripples.

Meanwhile, the illuminance of light emitted from the light source 50 is inversely proportional to the square of the distance in free space. If the distance between the light source 50 and the document 51 is increased to reduce illumination variations, however, there arises a problem of insufficient illuminance.

Thus, in order to solve such a problem, an image reader of a kind shown in FIG. 6 has been proposed, in which a transparent light guide 73 is disposed between a light source 71 and a document 72. Light derived from the light source 71 and incident on the light guide 73 of this image reader is led to an outgoing end surface S3 while being reflected by side surfaces S1, S2 of the light guide 73. The light goes out from the end surface S3 and reaches the document 72. In this way, the light guide 73 prevents the light from diffusing while the light is led from the light source 71 to the document 72, functioning to prevent illuminance insufficiency.

However, in the prior art example shown in FIG. 6, it is necessary to dispose the light guide 73 slantingly relative to the document such that reflected light from the document 72 will not be intercepted by the light guide 73, and it is also necessary to keep the light guide 73 away from the document 72 to some extent. The result is that light diffuses in the free space between the light guide 73 and the document 72 and consequently that sufficient illuminance is not ensured.

SUMMARY OF THE INVENTION

The object of the present invention is therefore to provide an image reader which is capable of illuminating a read object uniformly with sufficient illuminance without variations.

In order to achieve the aforementioned object, the present invention provides an image reader for reading image information of a read object by applying light derived from a light source to the read object via a light guide and receiving light reflected by the read object with a light-receiver, the light guide comprising:

a first end surface to be opposed to the read object;

a second end surface which is tilted at a constant tilt angle with respect to the first end surface and on which the light derived from the light source is to be incident; and first and second side surfaces located between the first end surface and the second end surface and opposed to each other, and the tilt angle being such an angle that the light derived from the light source and incident on the second end surface travels forward within the light guide while being reflected by at least one of the first side surface or the second side surface, and goes out from the first end surface, and that the light that impinges on and is reflected by the read object travels from the first end surface toward the second end surface, is further reflected by the second end surface, and goes out from the second side surface toward the light-receiver.

In the image reader of the present invention, light from the light source is incident on the second end surface of the light guide. This incident light travels between the first side surface and the second side surface opposed to each other while being reflected thereby, and goes out from the first end surface tilted with respect to the second end surface.

Then, outgoing light output from the first end surface impinges on the read object and is thereby reflected, entering the first end surface. The light that has entered the first end surface travels toward the second end surface, impinges on the second end surface and is thereby reflected so as to be directed to the second side surface, going out from the second end surface toward the light-receiving means. The light-receiving means that has received the light output from the second side surface reads image information of the read object based on the received light.

As seen above, in the present invention, since the light guide is provided between the light source and the read object, light dissipation is suppressed while the light from the light source travels through the light guide between the light source and the read object. Therefore, light is utilized with high efficiency. Also, since rays of light are mixed up inside the light guide, ripples, i.e., variations in illumination, are eliminated and thus uniform illumination is attained.

Further, the presence of the light guide elongates the distance between the light source and the read object, which also contributes to reduction of variations in illumination on the read object. Moreover, by the refracting action of the second end surface, which is an illuminating light input surface, rays of illuminating light are made to impinge on a document, which is a read object, at proper angles. Therefore, variations in light reception due to different angles of illumination onto the document surface will be eliminated.

Still, in the present invention, light for illuminating the read object is output from the first end surface opposed to the read object, and light reflected by the read object is input to the first end surface. Therefore, the first end surface is permitted to be in close contact with the read object. Therefore, light is prevented from dissipating toward the outside of the read object between the first end surface and the read object. As a result, the brightness with which the read object is illuminated is enhanced. Again, since image light from the read object is input to the first end surface, which is the outgoing surface of the illuminating light, the light guide and the read object, such as a document, can be put into close contact with each other. Accordingly, the illuminating light output from the light guide is prevented from diffusing, and the image light from the read object is prevented from diffusing, so that light is utilized with high efficiency.

As obvious from the above, according to the present invention, both increase of the intensity of illumination for read objects and reduction in variations in illumination are accomplished at the same time.

Also, in the present invention, light from the light source is input to the second end surface opposed to the light source, and the light reflected by the read object and incident on the first end surface is made to impinge on the second end surface so as to be reflected. That is, the second end surface serves both as an incident surface for light derived from the light source and as a reflecting surface for light coming from the read object, so that the configuration of the light guide is simplified. Since the image light derived from the read object such as a document changes its direction toward the second side surface by being reflected by the second end surface, an illuminating light input surface, the image light is taken out to outside from the second side surface, which is a surface other than the illuminating light input surface. Accordingly, the image light will never be intercepted by the light source for illumination or other optical systems, so that no restrictions are imposed on the arrangement of the light source and the like.

Further, the first end surface of the light guide is able to serve as a contact surface with the document, the stage glass for document is no longer necessitated.

According to an embodiment of the present invention, if a refractive index of the light guide is n, then an angle θ formed by the first end surface and the second end surface is set to $\theta \leq \sin^{-1}(1/n)$.

In this case, the reflected light from the read object is completely reflected by the second end surface. Accordingly, reflection loss at the second end surface is reduced. Since the quantity loss of light containing image information is reduced, the image reading performance is improved.

Further, according to an embodiment of the present invention, the first side surface and the second side surface are substantially parallel to each other.

With such an arrangement, the reflection angle at which light traveling toward the first end surface is reflected by the first side surface and the second side surface will not change with progress of the light. Accordingly, the outgoing angle of the light output from the first end surface is determined irrespectively of the size of the light guide in a direction in which the light guide extends from the light source toward the read object. As a result, the incident angle of the light upon the read object is easily controlled such that only diffused reflection forms an image on a light receiving line of the light receiver means.

Further, according to an embodiment of the present invention, a refractive index of the light guide, a direction in which light is incident from the light source upon the light guide, and the tilt angle are so set that the light traveling inside the light guide will be totally reflected upon impinging on the first and second side surfaces.

With such an arrangement, the light coming from the light source is allowed to travel inside the light guide without being leaked out from the first side surface and the second side surface.

Further, according to an embodiment of the present invention, the image reader comprises a light reflector means having a reflecting surface for reflecting the light derived from the light source such that the light reflected by the rejecting surface is directed to the second end surface of the light guide.

In this case, the light emitted by the light source is introduced to the second end surface of the light guide without loss.

In an embodiment, the reflecting surface of the light reflector means is composed of a curved surface or a plurality of surfaces bent relative to each other.

In this case, rays of the light coming from the light source are reflected so as to be incident on the second end surface of the light guide at substantially same specified angles.

Further, according to an embodiment of the present invention, the light guide has a cross section of right-angled trapezoidal shape surrounded by the first and second end surfaces and the first and second side surfaces, the first end surface being right-angled to the first and second side surfaces.

In this case, the illuminating light from the light source is made to be incident on the second end surface forming a tilted surface of the right-angled trapezoidal shape, and to be output from the first end surface forming the right angles of the right-angled trapezoid with the first and second side surfaces. In this case, because the illuminating light input surface (second end surface) is larger in area than the illuminating light output surface (first end surface), a great amount of light from the light source is captured at the second end surface and the use efficiency of light is improved. Furthermore, it is possible to control the illuminance at the document surface by controlling the light guide's thicknesswise size of the first end surface, which is an illuminating light output surface of the light guide. Moreover, the light guide is simple in configuration and therefore easy to manufacture so that a cost reduction can be expected.

According to an embodiment, a surface layer containing at least the first end surface is made of a wear-resistant substance.

In this case, when the read object is scanned while being moved in contact with the first end surface opposed to the read object, the first end surface is prevented from wearing. Accordingly, since the first end surface is prevented from deforming, the optical path is prevented from varying with time so that the reading performance is prevented from deteriorating.

BRIEF DESCRIPTION OF THE DRAWINGS

FIG. 3A is a view showing an optical path along which light is incident directly on a transparent board from a light source in the embodiment;

FIG. 3B is a view showing an optical path along which light derived from the light source is reflected by a concave mirror and then incident on the transparent board;

FIG. 4A is a side view of an essential part of a modified image reader having no reflecting mirrors;

FIGS. 4B and 4C are side views of an essential part of modified image readers having reflecting mirrors on both sides of the LEDs, respectively;

FIGS. 4D, 4E, and 4F are side views of an essential part of modified image readers in which the reflecting mirror extending oblique between an end of the light source and an end of the transparent board is provided by a flat plate-shaped mirror, a curved plate-shaped mirror, and a bent plate-shaped mirror, respectively;

DETAILED DESCRIPTION OF THE PREFERRED EMBODIMENTS

Figure 1:
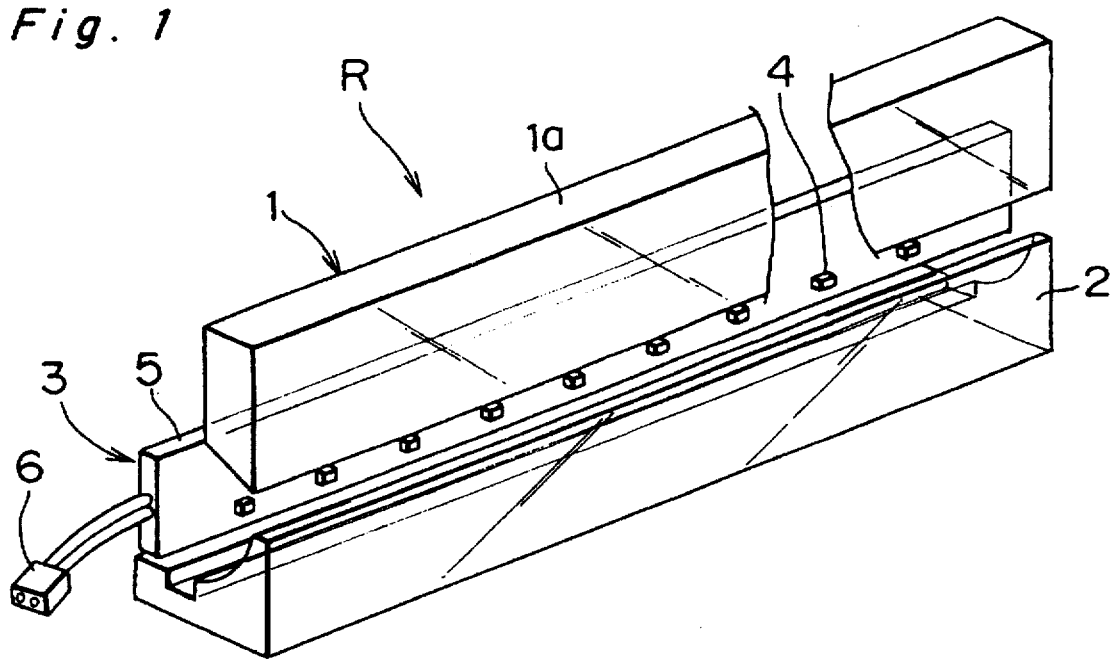
FIG. 1 is a perspective view of a main part of an embodiment of the image reader according to the present invention.

FIG. 1 shows an illumination unit R of an embodiment of the image reader according to the present invention, as viewed obliquely sideways. The illumination unit R has a light-guiding transparent board 1 having a right-angled trapezoidal cross section, a concave mirror 2, and a light source 3. The light source 3 has a printed circuit board 5, a plurality of LEDs (Light Emitting Diodes) 4 arrayed in line on the printed circuit board 5, and a connector 6 connected to the printed circuit board 5.

Figure 2A:
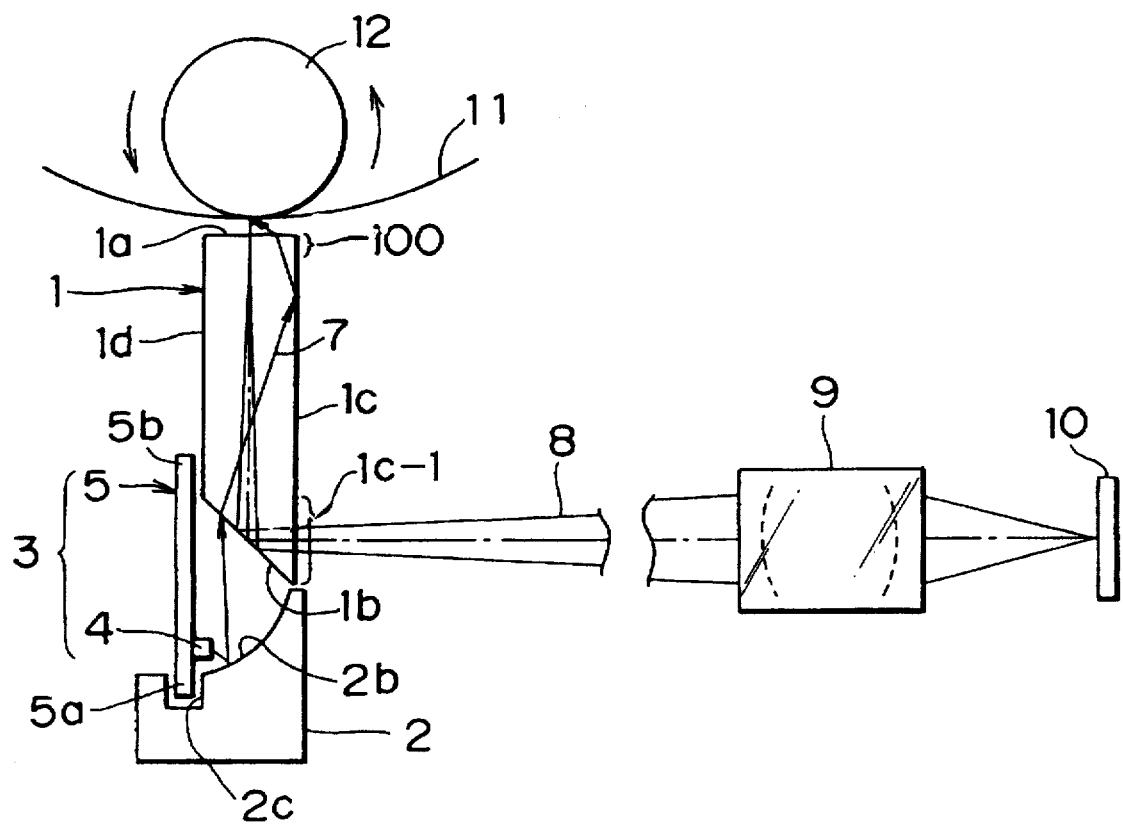
FIG. 2A is a side view showing an aspect of the embodiment as viewed sideways.

As shown in FIG. 2A, the transparent board 1 has an illuminating light output surface 1a opposed to a document 11, and an illuminating light input surface 1b tilted at a constant tilt angle of 45° with respect to the direction of the output surface 1a. The document 11 is an object to be read, the illuminating light output surface 1a is a first end surface, and the illuminating light input surface 1b is a second end surface.

In this embodiment, a surface layer 100 containing the illuminating light output surface 1a of the transparent board 1 is made of an acrylic transparent resin of the ultraviolet-curing type, which is called hard coat.

Further, the transparent board 1 has a first side surface 1d and a second side surface 1c located between the illuminating light output surface 1a and the illuminating light input surface 1b and opposed to each other. The second side surface 1c contains a light pickup surface 1c-1 through which light is taken out from the transparent board 1, and the light pickup surface 1c-1 is adjacent to and opposed to the illuminating light input surface 1b.

As shown in FIG. 2A, the transparent board 1 is disposed between the document 11 and the concave mirror 2, where the illuminating light output surface 1a is opposed to the document 11, while the illuminating light input surface 1b is opposed to a curved surface shaped reflecting concave surface 2b of the concave mirror 2. The document 11 is driven by a roller 12 and scanned between the illuminating light output surface 1a of the transparent board 1 and the roller 12.

The printed circuit board 5 of the light source 3 has a lower end portion 5a fitted in a recess 2c that connects to the concave surface 2b of the concave mirror 2, and an upper end portion 5b opposed to and substantially parallel to the first side surface 1d of the transparent board 1. Further, the LEDs 4 are arrayed in a row at a position slightly above the lower end portion 5a of the printed circuit board 5.

Further, a condenser lens 9 is provided at such a position that it is opposed to the light pickup surface 1c-1 of the transparent board 1 and separated therefrom to a specified distance. Besides, a photoelectric converter 10 to be illuminated with light condensed by the condenser lens 9 is provided so that its photodetection line is located in the image-forming position of the condenser lens 9. The photoelectric converter 10 is to be scanned in a lateral direction in which the row of the LEDs 4 extends. As shown in FIGS. 2E and 2F, the photoelectric converter 10 has a line CCD sensor 33 in which terminals 32 are soldered to a printed circuit board 36. The line CCD sensor 33 has cover glass 34 attached to its light-receiving surface. A line CCD sensor assembly 10a consisting essentially of the line CCD sensor 33 with the cover glass 34, the printed circuit board 36, and the terminals 32 is mounted on a board 31, and the terminals 32 are connected to a connector 35 for use of signal pickup. It is noted that a horizontal line indicated as a photodetection member in FIG. 2E represents the photodetection line within the line CCD sensor 33.

In the image reader having the above-described constitution, part of light emitted from the light source 3 directly goes to the illuminating light input surface 1b of the transparent board 1 as shown in FIG. 3A. Further, another part of the light emitted from the light source 3 goes to the concave surface 2b of the concave mirror 2, then reflected by the concave surface 2b, and directed to the input surface 1b of the transparent board 1, as shown in FIG. 3B.

Then, part of the light incident on the input surface 1b is refracted by the input surface 1b, and then enters the transparent board 1. Thereafter, like an illuminating ray 7 of FIG. 2A, the light, while being reflected by at least one of the first side surface 1d or the second side surface 1c of the transparent board 1, travels inside the transparent board 1 toward the illuminating light output surface 1a. Also, another part of the light incident on the input surface 1b, after refracted by the input surface 1b, enters the transparent board 1, and travels toward the illuminating light output surface 1a directly without being reflected by the first side surface 1d or the second side surface 1c.

The light reaching the illuminating light output surface 1a is refracted by the output surface 1a and goes out from the output surface 1a to the document 11. Then, after reflected by the document 11, the light travels to the illuminating light output surface 1a, and then, is refracted there, and further travels inside the transparent board 1 toward the illuminating light input surface 1b. Out of all rays of the light traveling toward the illuminating light input surface 1b, only rays of the light that travel generally straight inside the transparent board 1 are reflected by the illuminating light input surface 1b so as to travel from the light pickup surface 1c-1 of the second side surface 1c toward the condenser lens 9.

Then, the light traveling toward the condenser lens 9 is condensed by the condenser lens 9 and gets incident on the photoelectric converter 10. The photoelectric converter 10 reads image information of the document 11 based on the incident light.

As described above, the image reader of the present embodiment has the transparent board 1 disposed between the document 11 and the light source 3, so that the light from the light source 3 is applied to the document 11 via the transparent board 1. The presence of the transparent board 1 makes it possible to suppress the dissipation of light while the light from the light source 3 is traveling inside the transparent board 1, and to increase the optical path length between the light source 3 and the document 11. As a result, according to the present embodiment, the document 11 is substantially uniformly irradiated with light rays.

Further, the present embodiment is so arranged that the illuminating light output surface 1a of the transparent board 1 is in close contact with the document 11. Accordingly, light is prevented from being dissipated between the transparent board 1 and the document 11 so that light is utilized with high efficiency. Also, since the rays of light are mixed up inside the transparent board 1, uniform illumination is attained. Further, a proper angle at which the illuminating ray 7 impinges on the document 11 is obtained by the refracting action at the illuminating light input surface 1b. Accordingly, variations in light reception due to differences in the illumination angle relative to the document surface are eliminated.

According to the present embodiment, since the document 11 is illuminated brightly without intensity variations, the image reading performance is improved.

Also, according to the present embodiment, the illuminating light output surface 1a of the transparent board 1 serves both as an outgoing surface for the light directed to the document 11 and as an incident surface for the light reflected by the document 11. Moreover, the illuminating light input surface 1b of the transparent board 1 serves both as an incident surface for the light derived from the light source 3 and as a reflecting surface for the light reflected by the document 11. That is, the output surface 1a and input surface 1b of the transparent board 1 each play two roles. As a result, the configuration of the transparent board 1 is simplified.

In other words, according to the present embodiment, since the image light from the document 11 is reflected at the illuminating light input surface 1b, the image light goes outside from the second side surface 1c, and not from the illuminating light input surface 1b. Accordingly, the image light is never intercepted by the LEDs 4, which are the light source for illumination, or by other optical systems, so that no restrictions are imposed on the arrangement of the light source and the like. Further, since the output surface 1a of the transparent board 1 serves as a contact surface with the document 11, the stage glass for document is no longer necessitated. Also according to the present embodiment, the transparent board 1 has a cross section of a right-angled trapezoidal shape surrounded by the output surface 1a, the input surface 1b, and the first side surface 1d and the second side surface 1c, the illuminating light output surface 1a being perpendicular to the first and second side surfaces 1d and 1c. Such a simple shape of the transparent board 1 makes a cost reduction feasible. Further, illuminating light derived from the LEDs 4 enters the transparent board 1 through the input surface 1b that forms the tilted surface of the right-angled trapezoid, and then goes out from the output surface 1a that forms the right angles of the right-angled trapezoid together with the first and second side surfaces 1d and 1c. Because the tilted, illuminating light input surface 1b is larger in area than the illuminating light output surface 1a, the light from the LEDs 4 is used efficiently. Furthermore, illuminance at the document surface is easily controlled by controlling the width of the illuminating light output surface 1a corresponding to the thickness of the transparent board 1. In particular, where a reduced width of a region for document illumination can be used without any problem, it is possible to enhance the illuminance at the document surface by reducing the width of the illuminating light output surface 1a.

Also, in the present embodiment, the angle θ formed by the illuminating light output surface 1a and the illuminating light input surface 1b of the transparent board 1 made of acrylics with a refractive index n=1.49 is 45°. The angle θ satisfies the following equation, which is the condition for total reflection:

$$\theta \leq \sin^{-1}(1/1.49) = 42.16°$$

Accordingly, in the present embodiment, light that is reflected by the document 11 to travel generally straight toward the illuminating light input surface 1b is totally reflected by the input surface 1b. That is, the rectilinear light containing image information is prevented from dissipating, so that the image reading performance is improved.

When the transparent board 1 is made of common materials other than acrylics, the aforementioned angle θ=45° meets the total reflection condition. This is shown in the following TABLE 1.

TABLE 1

| n | $\sin^{-1}$ (1/n) | Material | |
|---|---|---|---|
| 1.49 | 42.16 | acrylic | * The refractive |
| 1.52 | 41.14 | BK7 (glass) | indexes n are |
| 1.59 | 38.97 | polystyrene | values for optical |
| 1.75 | 34.85 | SF13 (glass) | wavelength λ = 546.1 nm. |

Conversely, materials that do not meet the total reflection condition with the setting of angle θ=45° are those whose refractive indices are below 1.41. Although these low refractive index materials are not commonly used, using such a material is desirably accompanied by the setting of the angle θ to values larger than $\sin^{-1}(1/n)$.

Figure 2B:
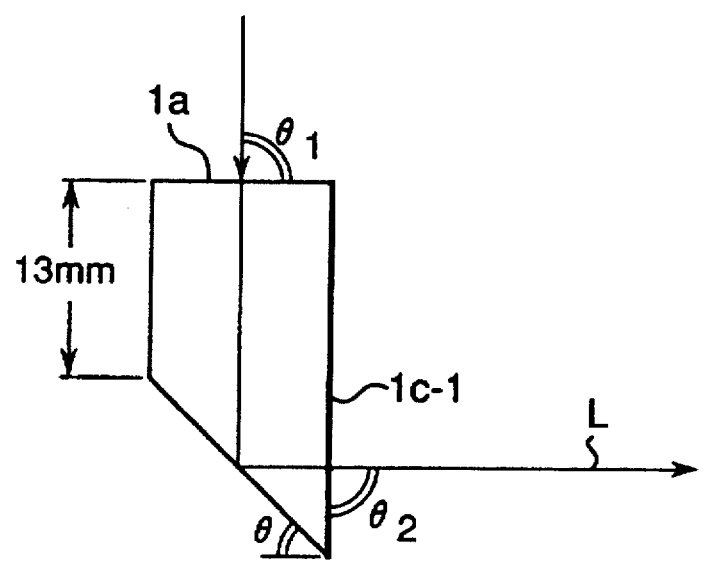
FIG. 2B is a view for explaining the outgoing angle of image light in the embodiment.
Figure 2C:
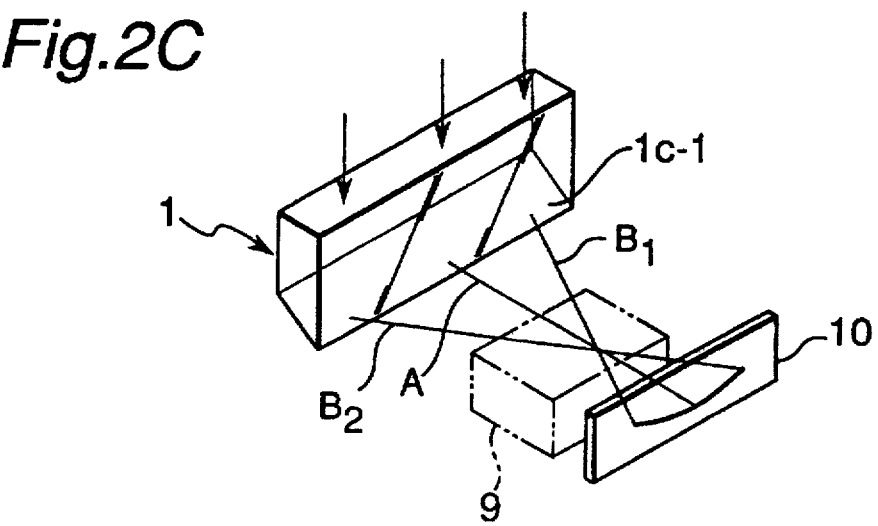
FIG. 2C is a view for explaining the outgoing angle of skew rays of image light in the embodiment.
Figure 2D:
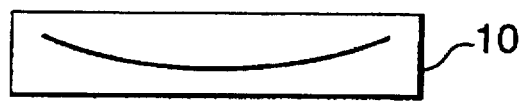
FIG. 2D shows a distorted image on a light-receiving surface of a photoelectric converter.
Figure 2E:
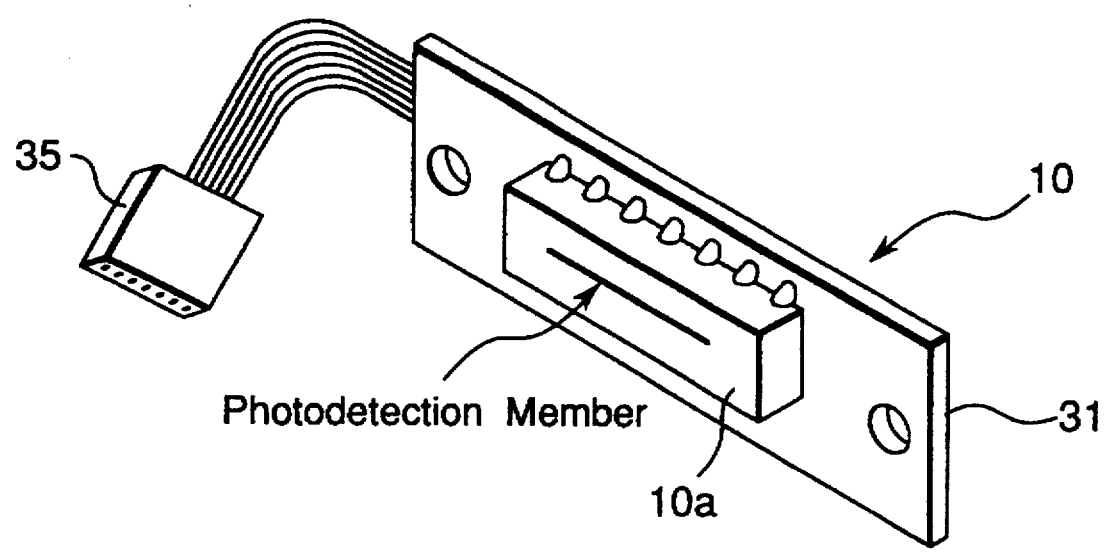
FIG. 2E is a perspective view showing the construction of the photoelectric converter in the embodiment.
Figure 2F:
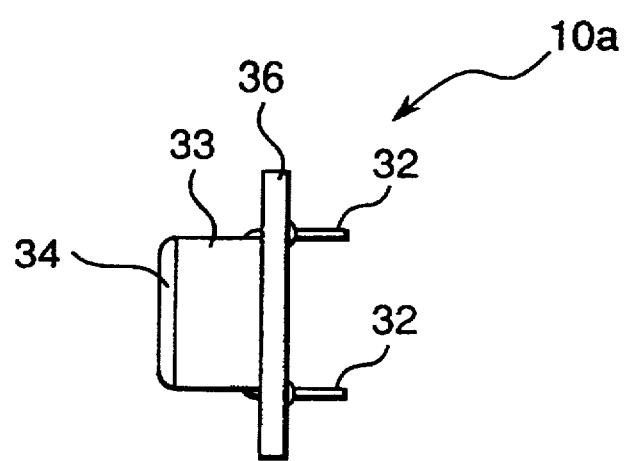
FIG. 2F is a side view showing the construction of the photoelectric converter.
Figure 5A:
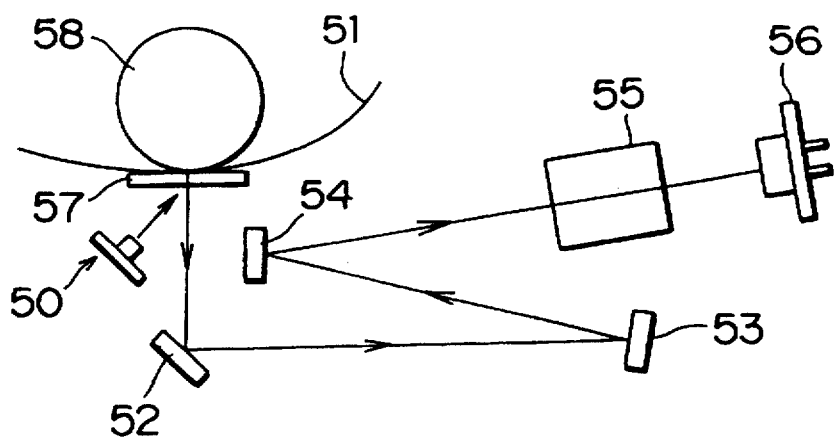
FIG. 5A is a schematic view of a prior art image reader.
Figure 5B:
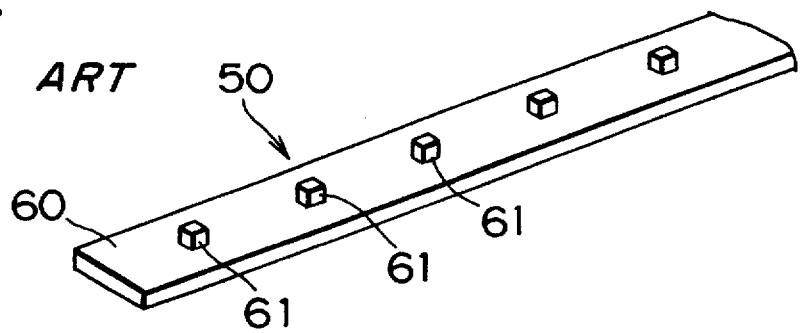
FIG. 5B is a perspective view of a light source of the prior art image reader.
Figure 6:
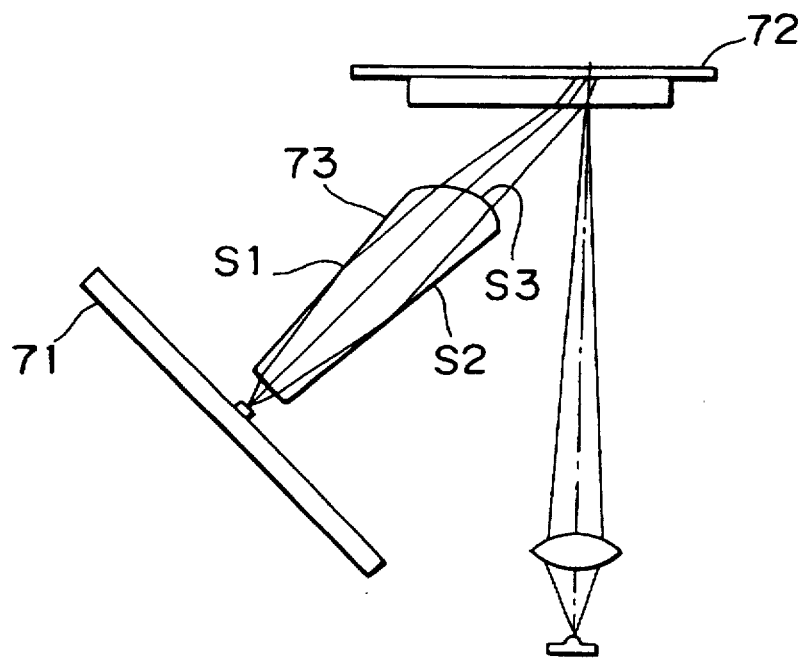
FIG. 6 is a schematic view of another prior art image reader.

Also, since the transparent board 1 serving as the light guide has a cross section of right-angled trapezoidal shape, image light L falling vertically on the illuminating light output surface 1a, with the tilt angle θ=45°, will go out vertically from the image light output surface 1c-1 as shown in FIG. 2B. Meanwhile, with the tilt angle θ≠45°, the vertically incident image light L goes out at an outgoing angle θ$_2$≠90°. In such a case, as shown in FIG. 2C, an image of a line at the light-receiving surface of the photoelectric converter 10 is distorted as a result of loosing the linearity between the longitudinal center and ends. The reason is that, as shown in FIGS. 2C and 2D, skew rays B$_1$, B$_2$ that travel obliquely from the lateral ends of the output surface 1c-1 of the transparent board 1 toward the lens 9 have been refracted by the output surface 1c-1 to more extent than a ray A that travels vertically from the output surface 1c-1 toward the lens 9. More specifically, if the permissible displacement from the line on the document surface is 0.1 mm at a maximum, the permissible value of the tilt angle θ is 45°±3° for a 13 mm height of the transparent board 1, as shown in FIG. 2B.

In the present embodiment, the first side surface 1d and the second side surface 1c of the transparent board 1 are substantially parallel to each other. Accordingly, the light that is incident from the light source 3 on the transparent board 1 and travels forward while being reflected by the first side surface 1d and/or the second side surface 1c will not change in reflection angle irrespective of how many times the reflection takes place. That is, the reflection angle is determined by the angle θ formed by the illuminating light input surface 1b and the illuminating light output surface 1a. Therefore, as shown in FIGS. 3A and 3B, the incident angles $\psi_1$, $\psi_2$, $\psi_3$, $\psi_4$ of rays from the illuminating light output surface 1a of the transparent board 1 onto the document 11 are easily set to values satisfying a condition that only their diffused reflection forms an image on the photodetection line. The aforementioned condition is, as is commonly known, is that $|\theta_1-\theta_2|$ is approx. 25° to 30° or more, where $\theta_1$ (including $\psi_1$, $\psi_2$, $\psi_3$, $\psi_4$) is the incident angle of light incident upon the document and $\theta_2$ is the reflection angle of light that is part of the light reflected from the document and that contributes to image formation on the photodetection line (both $\theta_1$ and $\theta_2$ are angles against the normal to the document surface). Reflected light with the reflection angle being close to $\theta_1$, as typified by $\theta_2=\theta_1$, is called "specular reflection" and is a kind of light unsuited to discriminate the color density of the document. To surely prevent such light from entering the photodetection line, the value of $|\theta_1-\theta_2|$ is set to 25° to 30° or above. With this setting, the photodetection line receives only the diffused reflection. In the present embodiment, since $\theta_2$ is set at near 0°, $\theta_1$ is properly set to 25° to 30° or more.

In the present embodiment, the transparent board 1 is made of acrylics with a refractive index of 1.49 and the angle θ formed by the output surface 1a and the input surface 1b is 45°. Therefore, if the light incident angle on the input surface 1b is set to within 45°, then the light incident angles $\psi_1$ to $\psi_4$ on the document 11 will be about 25° or more. Thus, the incident angles $\psi_1$ to $\psi_4$ of the light rays incident on the document 11 are set to values that satisfy the condition that only diffused reflection forms an image on the photodetection line. As a result, the density of the image inscribed on the document 11 can be discriminated with reliability.

The light incident angles $\psi_1$ to $\psi_4$ will not be changed by the distance between the output surface 1a and the input surface 1b of the transparent board 1. Therefore, the degree of freedom of design of the transparent board 1 can be enhanced. Moreover, the light that travels toward the output surface 1a inside the transparent board 1 is totally reflected by the first side surface 1d and the second side surface 1c. As a result, light dissipation is prevented so that brighter illumination to the document 11 is realized.

Further, the image reader of the present embodiment comprises the concave mirror 2 for reflecting light derived from the light source 3 to direct it to the illuminating light input surface 1b of the transparent board 1. Accordingly, light emitted by the light source 3 is introduced to the illuminating light input surface 1b without loss. Also, since the reflecting concave surface 2b of the concave mirror 2 is a curved surface, rays incident on the reflecting concave surface 2b in different directions are made incident on the input surface 1b in directions regulated to some extent. In particular, as shown in FIG. 3B, if the reflecting concave surface 2b is provided as a parabolic surface and the LEDs 4 of the light source 3 are positioned at the focal position of the parabolic surface, then the light reflected by the reflecting concave surface 2b will get incident upon the input surface 1b at an incident angle of approximately 45°. As a result, the incident angles $\psi_1$ to $\psi_4$ of the reflected rays on the document 11 become uniformly about 25° or more, which is an angle that meets the aforementioned condition. As a result, the density of the image inscribed on the document 11 is discriminated with reliability.

Further, in the present embodiment, the surface layer 100 containing the illuminating light output surface 1a of the transparent board 1 is made of an ultraviolet-curing type acrylic transparent resin, which is called hard coat. Accordingly, even if the document 11 is scanned in direct pressure contact with the output surface 1a by the roller 12, the output surface 1a is kept from wearing. As a result, the illuminating light output surface 1a is prevented from deforming, so that the optical path is prevented from variation with time, and that the reading performance is prevented from deteriorating. Furthermore, since no special guide member for the output surface 1a is required, the system construction is simplified.

Figure 7:
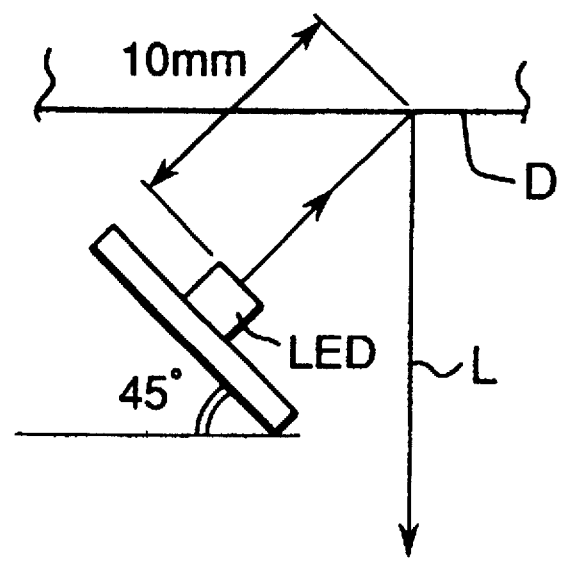
FIG. 7 is a view for explaining an experiment example in the prior art.

Next, results of an experiment by which the illuminance improvement effect of the present embodiment was concretely established are shown in TABLE 2. For this experiment, a prior art example in which the incident angle of a ray L on a document surface D was 45° and in which LEDs having a 10 mm optical distance to the document surface were secured to a plate was used as shown in FIG. 7. As shown in TABLE 2 below, according to the present embodiment, the average illuminance on the document surface D was increased to 1.2 times that of the prior art example, with the number of LEDs about half that of the prior art example:

TABLE 2

|  | Prior Art | Invention |
| --- | --- | --- |
| Average illuminance in illuminated area (4 mm × 270 mm) on the document surface D | 400 lux | 480 lux |
| Number of LEDs | 32 | 18 |

Whereas the transparent board 1 has been made of acrylics in the present embodiment, it may also be of crown glass.

FIGS. 4A–4F illustrate modified examples of the above embodiment which has the concave mirror 2 as the light reflecting means. The example of FIG. 4A has no concave mirror 2. The example shown in FIG. 4B is provided with reflecting mirrors 41, 41 of flat plate shape on both sides of the LEDs 4 of the light source 3. The example of FIG. 4C has curved reflecting mirrors 42, 42 on both sides of the LEDs 4. The example shown in FIG. 4D has a flat plate-shaped reflecting mirror 43 extending from a position adjacent to the LEDs 4 to an edge 1s of the transparent board 1. Instead of the flat plate-shaped reflecting mirror 43, a reflecting mirror 44 of curved plate shape or a reflecting mirror 45 of bent plate shape can be used, as shown in FIG. 4E and FIG. 4F, respectively.

Whereas the surface layer 100 containing the output surface 1a has been fabricated from a hard coat composed of an acrylic transparent resin in the present embodiment, it may alternatively be fabricated from a hard coat composed of a silicon resin. Also, the surface layer 100 can be an inorganic hard coat fabricated by sputter deposition of $SiO_2$.

Further, whereas the light source 3 has been provided by a pseudo-linear light source formed by arraying the LEDs 4 in a row on the printed circuit board 5 in the present embodiment, linear light sources such as fluorescent tubes and electroluminescence devices can also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reader for reading image information of a read object by applying light derived from a light source to the read object via a light guide and receiving light reflected by the read object with a light-receiving means, said light guide comprising:

a first end surface to be opposed to the read object;

a second end surface which is tilted at a constant tilt angle with respect to the first end surface and on which the light derived from the light source is to be incident; and first and second side surfaces located between the first end surface and the second end surface and opposed to each other, and said tilt angle being such an angle that at least part of the light derived from the light source and incident on the second end surface travels forward within the light guide while being reflected by at least one of the first side surface and the second side surface, and goes out from the first end surface, and that the light that impinges on and is reflected by the read object travels from the first end surface toward the second end surface, is further reflected by the second end surface, and goes out from the second side surface toward the light-receiving means.

2. The image reader according to claim 1, wherein if a refractive index of the light guide is n, then an angle θ formed by the first end surface and the second end surface is set to $\theta \leq \sin^{-1}(1/n)$.

3. The image reader according to claim 1, wherein the first side surface and the second side surface are substantially parallel to each other.

4. The image reader according to claim 1, wherein a refractive index of the light guide, a direction in which light is incident from the light source on the light guide, and the tilt angle are so set that the light traveling inside the light guide will be totally reflected upon impinging on the first and second side surfaces.

5. The image reader according to claim 1, comprising a light reflecting means having a reflecting surface for reflecting the light derived from the light source such that the light reflected by the reflecting surface is directed to the second end surface of the light guide.

6. The image reader according to claim 5, wherein the reflecting surface of the light reflecting means is composed of a curved surface or a plurality of surfaces bent relative to each other.

7. The image reader according to claim 1, wherein the light guide has a cross section of right-angled trapezoidal shape defined by the first and second end surfaces and the first and second side surfaces, the first end surface being right-angled to the first and second side surfaces.

8. The image reader according to claim 1, wherein a surface layer containing at least the first end surface is made of a wear-resistant substance.

9. The image reader according to claim 1, wherein said light source is a linear array of light sources and said light guide mixes light from the linear array prior to impinging upon the read object.

10. A method for guiding light in an image reader for reading image information of a read object comprising the steps of:

positioning a light guide having a first end surface opposite the read object and a second end surface tilted at a constant tilt angle with respect to the first end surface, and first and second side surfaces located between the first end surface and the second end surface and opposed to each other;

applying light derived from a light source to the second end surface;

reflecting the light derived from the light source and incident on the second end surface by at least one of the first side surface and the second side surface, and outputting the light reflected by a side surface from the first end surface;

impinging the light on the read object, the light reflected from the read object travelling from the first end surface toward the second end surface; and reflecting the light from the read object by the second end surface to a light-receiver to thereby read image information.

11. The method according to claim 10, further comprising, when a refractive index of the light guide is n, setting an angle θ formed by the first end surface and the second end surface to be greater than or equal to $\sin^{-1}(1/n)$.

12. The method according to claim 10, further comprising setting a refractive index of the light guide, a direction in which light is incident form the light source on the light guide and the tilt angle so that the light traveling inside the light guide will be totally reflected upon impinging on the first and second side surfaces.

13. The method according to claim 10, further comprising reflecting light derived from the light source to the second end surface of the light guide.

14. The method according to claim 10, wherein the light source is a linear array of light sources and further comprising mixing light from the light sources in the light guide prior to said impinging step.

* * * * *